W. W. CAREY.
Loose Pulleys.

No. 134,250.  Patented Dec. 24, 1872.

Witnesses
S. N. Piper.
L. N. Holler.

Wilson W. Carey.
by his attorney
R. H. Eddy

UNITED STATES PATENT OFFICE.

WILSON W. CAREY, OF LOWELL, MASSACHUSETTS.

IMPROVEMENT IN LOOSE PULLEYS.

Specification forming part of Letters Patent No. 134,250, dated December 24, 1872.

*To all whom it may concern:*

Be it known that I, WILSON W. CAREY, of Lowell, of the county of Middlesex and State of Massachusetts, have invented a new and useful Improvement in Loose Pulleys for Shafts; and do hereby declare the same to be fully described in the following specification and represented in the accompanying drawing, of which—

Figure 1:
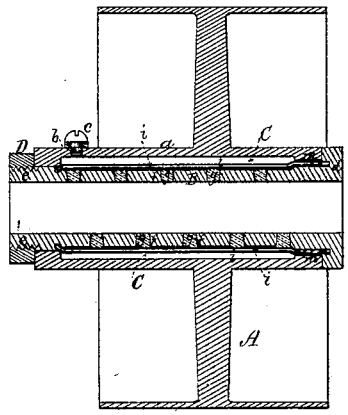
Figure 2:
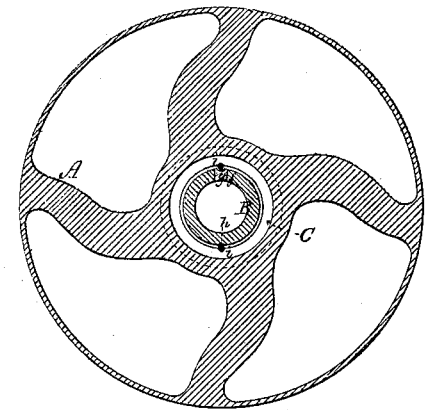
Figure 4:
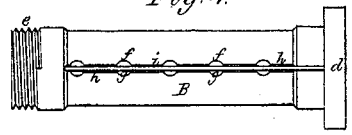
Figure 3:
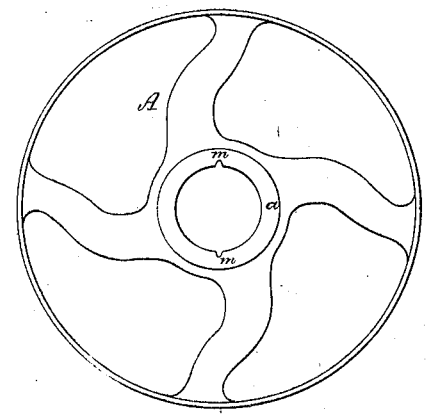
Figure 5:
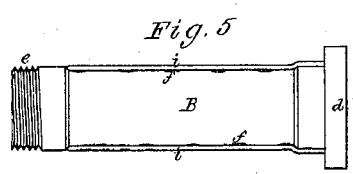

Figure 1 is a longitudinal section, and Fig. 2 a transverse section, of a pulley provided with my invention. Fig. 3 is an end view of such pulley without the separable bolt. Fig. 4 is a top view, and Fig. 5 a side elevation, of such bolt.

The principal object of my invention is to render the pulley what is termed a self-lubricating one, it containing a reservoir for holding oil, such reservoir having one or more or a series of educts, each of which contains or is to contain a strainer consisting of a plug of leather, or other suitable material, such as will not only serve as a filter or strainer, but as a means of slowly delivering the oil or lubricating fluid upon the revolving shaft of the pulley while the latter may be in revolution. In order to prevent displacement of the strainers, or their ejection from their sockets by centrifugal force while the pulley may be in revolution, I apply to their carrier-bolt one or more wires, arranged in a groove or grooves made in such bolt, all being substantially as hereinafter described and represented.

In the drawing, A denotes what machinists term a loose pulley, whose hub $a$ is hollow or tubular, and is provided with a separable tubular bearing or bolt, B, to extend through the hub, in manner as shown. This bolt B, when in place in the hub, is surrounded by an oil-receiving space or reservoir, C, formed within its hub, and provided with an induct, $b$, having a stop-screw, $c$. The bolt has a head, $d$, at one end, and a male screw, $e$, at the other, the said screw being to receive a prismatic nut, D, which, with the bolt-head, serves to hold the bolt in place in the hub. Furthermore, the bolt-shank is perforated radially with one or more holes or one or more series of holes, $f$, those of each series being arranged in line lengthwise of the bolt, each hole being tapering, and having or being intended to receive a plug or strainer, $g$, of leather or other suitable material. The holes or strainer sockets of each series are provided with a groove, $h$, formed in the outer surface of the shank of the bolt, and extended from one socket to the other of the series. There is laid in each groove a wire, $i$, to rest on the strainers, and project from the groove, especially near the head of the bolt, the wire at its ends being secured in the bolt. This wire serves to keep the strainers from being ejected from their sockets by centrifugal force and thrown into the oil-reservoir while the pulley may be in revolution on its shaft. The wire or wires also answer another purpose, viz., to prevent the bolt from revolving in and independently of the pulley, for each wire extends into a notch or groove made in the hub, as shown at $m$ in Fig. 3. The bolt, fitting at or near its ends to the hub, serves with the nut to prevent escape of oil from the reservoir except through the strainers.

From the above it will be seen that the pulley while in operation will supply oil to the bearing-surfaces of its shaft and bolt.

The advantages of the separable bolt are that it admits of the oil-reservoir being easily cleaned, and also enables access to the strainers to be readily had for their renewal or insertion, as circumstances may require.

I make no claim to any thing or combination shown or described in either of the United States Patents Nos. 47,561, 73,459.

What I claim as my invention is as follows, viz:

1. The pulley, as provided with the oil-chamber C in its hub, and with the separable tubular bolt B furnished with one or more strainers and sockets therefor, all being arranged substantially as set forth, and the bolt having a screw and nut for holding it in place in the hub, as explained.

2. The separable bolt, as provided with the series of strainers $g$ or their sockets $f$, and with the groove $h$ and cap-wire $i$, all being arranged substantially as set forth, whether the cap-wire be employed merely to cover the strainers, or for such purpose and as a spline or means to prevent the bolt from revolving within and independently of the hub of the pulley.

WILSON W. CAREY.

Witnesses:
R. H. EDDY,
J. R. SNOW.